United States Patent [19]

Snow

[11] Patent Number: 5,211,438
[45] Date of Patent: May 18, 1993

[54] SELF-ANCHORING WINDSHIELD COVER

[76] Inventor: Michael J. Snow, 44 Estrada Rd., Central Valley, N.Y. 10917

[21] Appl. No.: 956,464

[22] Filed: Oct. 2, 1992

Related U.S. Application Data

[63] Continuation of Ser. No. 810,888, Dec. 20, 1991, abandoned.

[51] Int. Cl.⁵ .............................................. B60J 11/00
[52] U.S. Cl. ................................... 296/95.1; 296/136; 160/370.2; 150/168
[58] Field of Search .................. 296/98, 95.1, 136; 160/370.2; 150/166, 168; 297/219; 5/925; 428/441

[56] References Cited

U.S. PATENT DOCUMENTS

| | | |
|---|---|---|
| 2,065,242 | 12/1936 | Omerly, Jr. .................. 296/95.1 X |
| 3,964,780 | 6/1976 | Naidu ................................ 150/168 |
| 4,025,103 | 5/1977 | Eichstaedt .................. 160/370.2 X |
| 4,598,883 | 7/1986 | Suter .................................. 244/1 R |
| 4,635,993 | 1/1987 | Hooper et al. .................... 296/95.1 |
| 4,811,982 | 3/1989 | Carlyle .............................. 296/95.1 |
| 4,889,754 | 12/1989 | Vargas ........................... 296/95.1 X |
| 5,002,326 | 3/1991 | Westfield ........................... 296/95.1 |
| 5,015,037 | 5/1991 | Giblin et al. ............. 297/DIG. 2 X |
| 5,037,156 | 8/1991 | Lundberg ......................... 296/95.1 |

FOREIGN PATENT DOCUMENTS 0102621 6/1984 Japan ................................. 296/136

*Primary Examiner*—Dennis H. Pedder
*Attorney, Agent, or Firm*—Jacobson, Price, Holman & Stern

[57] ABSTRACT

This invention relates to a self-anchoring anti-frost and anti-snow windshield cover made from certain elastomeric material which may be configured to ensure self-adherence to windshields, thus resulting in a product offering convenience and ease of application, and requiring short application time.

4 Claims, 2 Drawing Sheets

SELF-ANCHORING WINDSHIELD COVER

This is a continuation of application Ser. No. 07/810,888, filed Dec. 20, 1991, now abandoned.

BACKGROUND OF THE INVENTION

The present invention relates to anti-frost and anti-snow windshield covers for use on vehicles not afforded garage or carport protection.

Devices of this type address the problem of frost and snow build-up on windshields by using a material (usually plastic sheets) to cover, either, the entire vehicle or just the front windshield. The present invention concerns itself with the latter.

Prior devices of this type require the user to drape a sheet-like material across the windshield, arrange it for a reasonably conforming fit, clamp one side of the cover in the front door, walk around the vehicle and clamp the other side of the cover in the other front door. If the user has positioned the cover to his satisfaction, application is complete. If the user decides that he has not properly positioned the cover, the vehicle doors must be re-opened, cover repositioned, and cover sides re-clamped in each door again . . . and so on, until the user is satisfied that there is good windshield coverage. As an aid to positioning and clamping the material, some products have magnets imbedded in the borders of the window covering for anchorage to the vehicle's frame while other products have other/additional anchoring aids such as snaps, suction cups, etc.

Removal of existing covers requires the user to walk around and reach across the vehicle to release the various anchoring devices used, shake any precipitation off the cover and fold it up for storage until later reapplication is desired.

The most substantial difficulty with existing devices is the time-consuming and cumbersome method of application, which, during cold/wet/dark ambient conditions, is quite uncomfortable. This difficulty is due to the use in prior devices of materials so inelastic that unless pulled taut they don't lie flat on the windshield, and which are so structurally weak that unless clamped they slide down the windshield. Thus, the user must take the time to ensure that the sheet properly covers the windshield and will remain in place. Removal of a known cover, though less time-consuming than its application, is still excessive since the user must at least unclamp the material from both doors and release any other anchoring devices.

Another problem encountered with existing covers is that the user can easily soil his clothes when reaching across the precipitation-coated cover to apply or release the various anchoring devices. A further problem is that, when the material is thin plastic, the sheet often freezes to the windshield because of moisture accidentally transferred from the cover's wet side to its dry side during between-use storage; this moisture transfer occurs because the sheet evolves into a crinkled and inflexible surface, which traps and retains moisture, that inhibits like-side-to-like-side folding of the cover for storage.

SUMMARY OF THE INVENTION

It is the primary object of the present invention to provide cold weather protection for windshields without the excessive amount of user handling time and frustration associated with state-of-the-art products.

This result is achieved by configuring certain elastomeric materials so as to provide a self-anchoring anti-frost and anti-snow windshield cover that is quick and easy to handle during application, removal and storage.

The present invention uses elastomeric materials (e.g., "neoprene" type rubber, clay-based rubber, etc.), of certain durometric and weight combinations for sufficient strength and elasticity, as the raw material for fabricating an anti-frost and anti-snow windshield cover. The cover is processed from this raw material by rendering it into a sheet-like form with a structurally-sound configuration such that when the finished article is placed on a windshield it will remain flat and self-anchored because it is neither too flexible nor heavy that it collapses, and neither too inflexible nor light that it will not lie flat. The final article is made small enough that it does not overlap the borders of any windshield and, thus, lies completely flat upon the windshield to prevent all but the most extremely forceful of winds and precipitation from gaining entry between cover and windshield, which would reduce the invention's effectiveness. The cover is also made broad enough in its planar coverage to yield sufficient visual clarity through the windshield after the cover has been removed.

The invention's self-anchorage, therefore, is ensured by three complemental and interactive factors: 1) using elastomeric material of specific thickness and durometric readings to ensure that the cover is flexible enough to lie flat upon the windshield, yet strong enough to prevent in-place vertical collapse, 2) giving the sheet a structurally sound configuration, including, for high-tilt windshields, a bottom-edge shape that contributes to the support of the entire cover via its abutment at the windshield's bottom-edge border (low-tilt windshields do not require covers with a special bottom-edge shape, since the concentration of gravitational forces at this site is too low to induce vertical cover collapse), and 3) keeping the cover internal to the windshield's borders for a flat interface with the windshield to enhance frictional support and discourage ingressive disruption of cover anchorage by the elements.

Application of the cover is by "throwing" it high up onto the windshield and letting it slide down until halted and supported at the windshield bottom-edge border, or, if application is to a low-sloped windshield wherein the cover doesn't slide downward, simply throw the cover so that it lands for proper coverage. Removal is by gripping side edge of the sheet and pulling the entire cover off the windshield. Storage is by shaking moisture off the cover's inherently non-crinkling surface and folding it, like-side-to-like-side, in half or in quarters.

DETAILED DESCRIPTION OF THE PREFERRED EMBODIMENT

Figure 1:
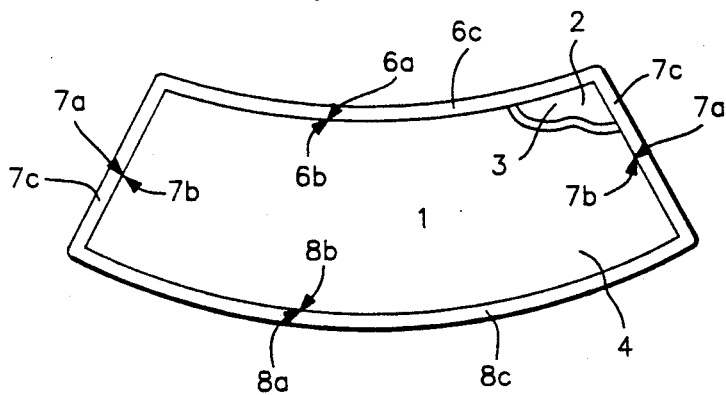
FIG. 1 is a schematic frontal view of a self-anchoring windshield cover in accordance with the present invention in place upon an automobile's front windshield.
Figure 2:
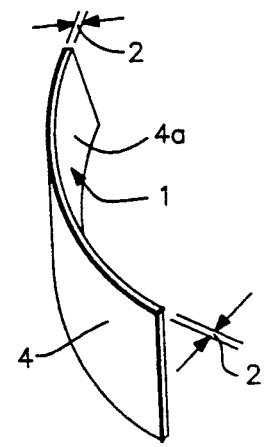
FIG. 2 is an overhead isometric view of the present invention in a curved orientation.

Referring to FIGS. 1 and 2, the self-anchoring anti-elements or anti-frost and anti-snow windshield cover characterizing the principal embodiment of the present invention is generally illustrated by numeral 1. The material of choice for the instant invention is sheet-like elastomeric material which may be clay-based or neoprene-like. Self-anchorage on windshields of up to about an 80-degree tilt is effected by the frictionally-effective and mutually-interactive characteristics of cover thickness 2, elasticity and shape.

As to the frictionally-interactive or complementary characteristics of the cover thickness 2 and cover elasticity, these two characteristics must be in the right proportions to contribute to the cover's frictional interface with and self-anchorage to a windshield 3; i.e., the cover 1 conforms to windshield curvature if there is neither too much nor too little flexibility (durometric reading) and neither too much nor too little weight (thickness) to cause collapse of the cover. Thus, while there is a functional range of uniform cover thickness, 1/16" to 3/16", and uniform durometric combinations, 50 to 70, the best mode of the invention uses a combination of 2/16" thickness and a durometric reading of 70.

Figure 3:
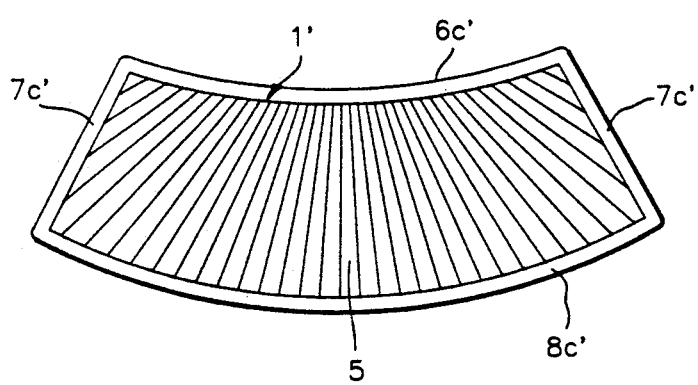
FIG. 3 is a schematic frontal view of another embodiment of the present invention, with a structurally enhancing front surface configuration, in-place upon an automobile's front windshield.
Figure 4:
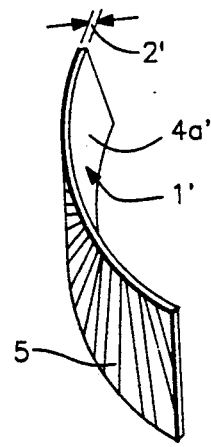
FIG. 4 is an overhead isometric view of the present invention as shown in FIG. 3, in the curved orientation, with a structurally enhancing front surface configuration.

The cover 1 in FIG. 1 is substantially smooth on both of its face surfaces, 4 and 4a, so that the cover can be reversibly applicable to the windshield 3. The smooth surface 4 or 4a provides a continuous frictional interface between the windshield 3 and the cover 1, which complements the other cover characteristics in effecting frictional self-anchorage. As an alternative to both cover surfaces 4 and 4a being smooth, however, a front surface 5 could have an etched or grooved configuration to yield protrusions in the form of, for example, ribs or ridges or other such structurally enhancing shapes for further vertical strength, as is shown in FIGS. 3 and 4. These ribs or ridges should reach to a depth of approximately one-third of total cover thickness.

The cover 1 is sufficiently broad in its planar shape so as to cover a desired portion of the windshield 3 and has a "regular" perimeter wherein each cover border or side is either a substantially smooth curve or a substantially straight line. This perimeter constraint ensures protection of an adequate area of the windshield surface so as to yield a sufficiently clear windshield view upon removal, and also ensures that the cover 1 does not collapse due to disruptively high concentrations of gravitational forces at any point upon the cover 1. That is, the perimeter shape ensures that the cover 1 has effective complemental structural integrity for self-anchorage, by the functionally effective distribution of gravitational forces upon the cover. Additionally, the cover 1 does not extend beyond a windshield bottom-edge border or border curve 8b as shown in FIG. 1 or its top edge border or border curve 6b, and side edge border or border curves 7b of FIG. 1. In other words, the cover 1 does not extend beyond the glass surface of the windshield 3 to overlap windshield top, side and bottom edge containment ridge and border-defining members 6c, 7c and 8c, that is, the juncture between the windshield's glass and its containment ridge members. This significantly reduces the likelihood of an elevation of and intrusion under cover edges 6a, 7a and 8a by winds or precipitates. Thus, as is clearly illustrated in FIG. 1, the best mode shape for the cover top, side and bottom edges 6a, 7a and 8a is one which substantially follows the associated windshield borders 6b, 7b and 8b.

The shape or curve of the bottom edge 8a of the cover 1 is not merely for broad windshield coverage, rather, it further complements the cover's frictional interface when the cover is in a relatively high-tilt orientation where the cover slides down on the windshield 3 until halted by the bottom edge engaging the windshield bottom-edge containment ridge member 8c. Specifically, the cover's bottom-edge shape ensures that the gravitational forces are effectively distributed throughout the entire cover 1, including an effective distribution of such gravitational forces along the cover's bottom edge 8a where the gravitational forces upon the cited cover shape are at their highest concentration at the cover's bottom-edge curve midpoint, when the cover's bottom edge shape is in abutment with the windshield's bottom-edge containment ridge member 8c. That is, while covers 1 on relatively low-angle or low-tilt windshields 3 are supported mostly by back surface frictional interface, covers on relatively high-angle or high-tilt windshields require more frictional and structural support provided by the bottom-edge shape of the cover. Indeed, if the cover 1 has a shallower bottom-edge curve 8a than that of a sufficiently high-tilt windshield 3 such that the cover slides down on the windshield, then the gravitational forces upon the cover will not be effectively distributed when the cover bottom edge engages the containment ridge member 8c and the cover will collapse. Thus, the best mode bottom-edge shape for the cover 1 when on high-tilt windshields 3, or low-tilt windshields for best overall windshield coverage, is a downwardly arcuate curve that substantially approximates that of the windshield's bottom-edge border 8b.

Figure 5A:
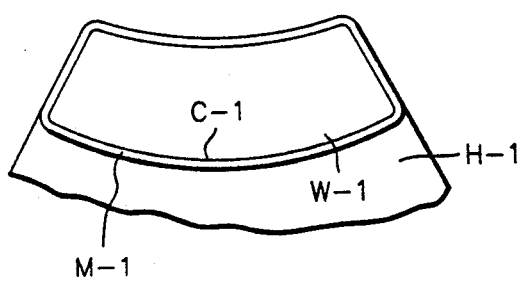
FIGS. 5a, 5b and 5c are frontal schematic views of three major types of windshields, each with a different type of bottom-edge border.
Figure 5B:
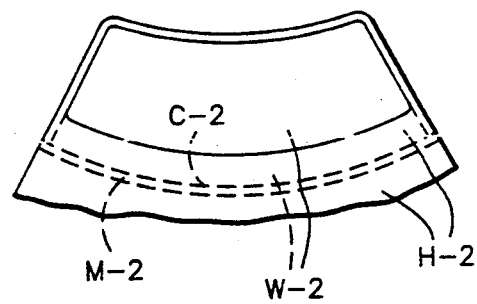
Figure 5C:
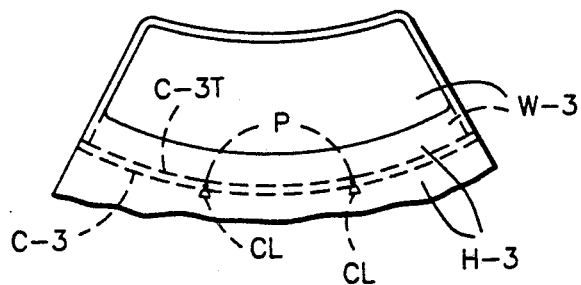

Variations in a windshield bottom-edge border curve, because it defines the cover's bottom-edge shape, is herein defined by the following three main windshield types, see FIGS. 5a, 5b and 5c, which are sometimes collectively and individually referred to herein as the "windshield bottom-edge border".

1) The first type, illustrated in FIG. 5a, is a curve C-1 made by the juncture of a windshield W-1 and its bottom-edge containment ridge member M-1 member M-1 at the juncture of the vehicle's hood H-1;
2) The second type, illustrated in FIG. 5b, is also made by the juncture of a windshield W-2 and its bottom-edge containment ridge member M-2, except that this curve C-2 is found recessed within an exposed cavity below the vehicle's hood H-2; and
3) The third type, illustrated in FIG. 5c, is a faithful geometric translation C-3T representative of a windshield's exposed bottom edge curve C-3, which bottom edge curve is supported by clamps CL within an exposed cavity below the vehicle's hood H-3, with the translation curve extending through points P atop of the windshield bottom-edge clamps.

Figure 6:
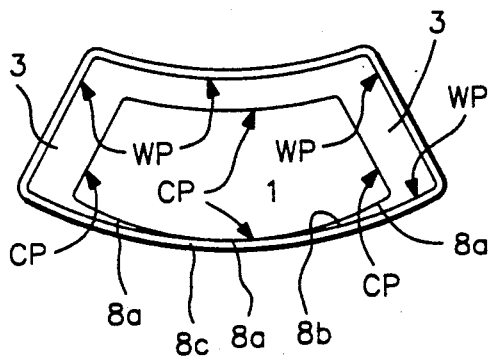
FIG. 6 is a frontal schematic view of the present invention shaped to fit a windshield, whose bottom-edge curve is deeper or sharper than the bottom-edge curve of the windshield upon which it is placed.

With reference to FIG. 6, the top-, side- and bottom-edge borders of, each, the windshield 3 and the cover 1, are herein defined as, respectively, the "windshield perimeter WP" and the "cover perimeter".

As illustrated in FIG. 6, any specific best-mode cover 1 will also function on windshields 3 whose bottom-edge border curve 8b is shallower or flatter than the cover's bottom-edge border curve 8a. For this purpose, each point along the cover's entire border curve 8a must have a deeper geometric slope than that of each vertically corresponding point along the windshield's bottom-edge border curve 8b if, additionally, the windshield perimeter WP is not overlapped by the cover perimeter CP at any point, which non-overlapment is usually the case since windshields of shallower bottom-edge borders usually represent larger windshields. That is, any specific best mode cover 1 is also universally functional upon a set of windshields 3 with shallower bottom-edge border curves 8b.

The cross-application of covers 1 on different windshields 3 is viable because the cover bottom-edge shape, again, effectively contributes to the preclusion of excessive gravitational forces at any point throughout the cover that would cause cover collapse. Indeed, for high-tilt windshields 3, other functional bottom-edge cover shapes also include those with a bottom-edge curve 8a equal to or shallower than a circle but deeper or sharper than that of the subject windshield bottom-edge border curve 8b, as well as total cover shapes such as circle arcs, circles, etc., that prevent cover collapse.

The constraint upon a functional bottom-edge cover shape requires that the bottom edge border curves 8a must be based on (equal to or deeper than) those taken from the same cone from which the windshield's bottom-edge parabolic curve is based. In this connection, basically, the windshields 3 are conic sections with a parabolic bottom-edge mid-section. This means that if one tries to place a conic section from a larger cone on a windshield 3 based on a smaller cone, the cover simply will not lie flat and self-anchored because it does not have the right combination of frictional/gravitational forces.

Figure 7:
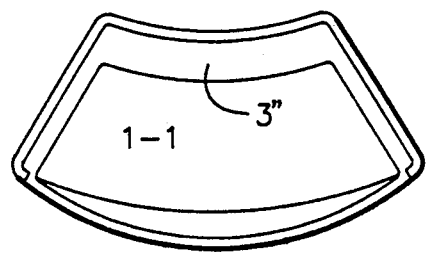
FIGS. 7, 7a, 7b, 7c and 7d are frontal schematic views of additional typical shapes functionally suitable to the present invention's use upon low-tilt windshields.
Figure 7A:
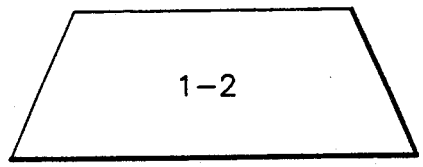
Figure 7B:
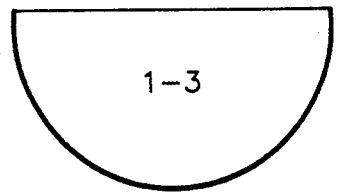
Figure 7C:
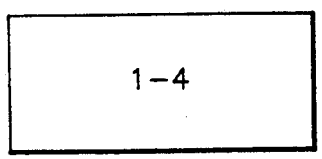
Figure 7D:
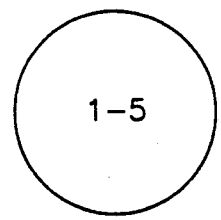

While the preceding constraints are requisite to covers used on high-tilt windshields, the covers 1 are also functional on low-tilt windshields 3" as illustrated in FIG. 7, which is another embodiment of the invention, This embodiment also includes shapes typical to those illustrated in FIGS. 7a, 7b, 7c, and 7d for use on low-tilt windshields, such as 3 of FIG. 7, and entails the same materials and structural characteristics outlined above, with the exception that since the cover does not slide down on the low tilt windshield it does not require the structurally and frictionally supportive bottom-edge curve 8a to remain self-anchored upon the windshield, and, consequently, may take any generally broad planar shape and still remain self-anchored to the windshield. For example, the cover may be an arc-shaped cover 1—1 as shown in FIG. 7; a trapezoidal cover 1-2 as shown in FIG. 7a; a cover 1-3 in the form of a partial circle as shown in FIG. 7b; a rectangular cover 1-4 as shown in FIG. 7c; or a circular cover 1-5 as shown in FIG. 7d.

Figure 8:
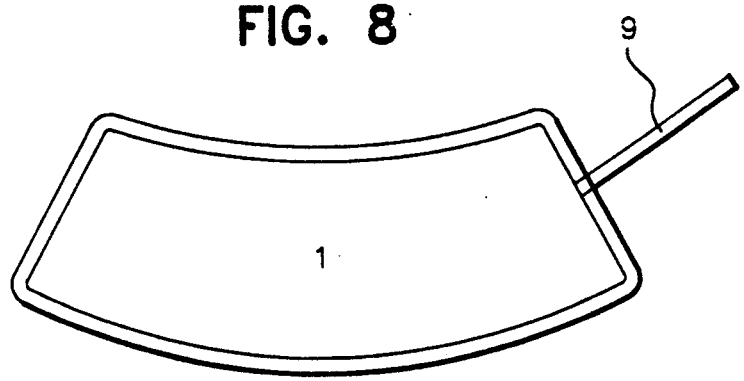
FIG. 8 is a schematic frontal view of the present invention as shown in FIG. 1 with a single theft-prevention strap attached to one side end.

Further features of the invention entail a surface-reflective color so that the cover 1 can be used in the summer as a sunscreen, and a theft-prevention strap 9 (security strap) attached to the cover for clamping in the driver's-side front door as can be seen in FIG. 8.

The foregoing description is intended by way of example only and is not intended to limit the present invention in any way except as set forth in the following claims.

I claim:

1. A protective cover for protecting at least a portion of a glass surface of a windshield from the elements, which is self-anchoring when merely placed upon the windshield glass surface, and which consists essentially of:

a sheet of elastomeric material having top, side and bottom edges, and a top surface and a substantially smooth bottom surface, said sheet being dimensioned such that said edges do not extend beyond respective top, side and bottom edge borders of the windshield glass surface when the sheet is placed on the glass surface;

said sheet of elastomeric material having a flexibility such that the entire bottom surface of said sheet lies against the windshield glass surface when placed thereon to define a continuous frictional interface therewith and thus enhance self-anchorage of the sheet to the glass surface; and said sheet of elastomeric material further having an overall substantially uniform thickness in a range of 1/16 to 3/16 inch, and an overall substantially uniform durometric hardness reading in a range of 50 to 70, so that said sheet also is self-supporting and does not collapse due to its own weight and gravitational forces when placed on the windshield glass surface, the combination of said sheet thickness, durometric hardness and substantially smooth bottom surface also cooperating to effect frictional self-anchorage of the sheet to the windshield glass surface.

2. The protective cover as recited in claim 1, wherein the top and side edges of the elastomeric sheet are parallel to the top and side edge borders of the windshield glass surface when the sheet is placed on the glass surface.

3. The protective cover as recited in claim 1, wherein the elastomeric sheet has an irregular, top surface comprising structural strength-enhancing protrusions extending to a depth of ⅓ of the overall maximum thickness of the sheet.

4. The protective cover as recited in claim 1, wherein the top surface also is a substantially smooth windshield glass-engageable surface so that the cover is reversible.

* * * * *